(12) United States Patent
Mhaske et al.

(10) Patent No.: US 10,966,096 B1
(45) Date of Patent: Mar. 30, 2021

(54) SYSTEMS AND METHODS FOR SYSTEM RECOVERY FROM A SYSTEM USER INTERFACE PROCESS MALFUNCTION

(71) Applicant: Symantec Corporation, Mountain View, CA (US)

(72) Inventors: Sharad Mhaske, Maharashtra (IN); Shrikant Pawar, Mumbai (IN)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 16/223,388

(22) Filed: Dec. 18, 2018

(51) Int. Cl.
*G06F 11/07* (2006.01)
*H04L 29/06* (2006.01)
*H04W 12/37* (2021.01)
*H04W 8/18* (2009.01)

(52) U.S. Cl.
CPC ......... *H04W 12/37* (2021.01); *G06F 11/0742* (2013.01); *G06F 11/0793* (2013.01); *H04L 63/205* (2013.01); *H04W 8/18* (2013.01)

(58) Field of Classification Search
CPC ... H04W 12/0027; H04W 8/18; H04W 12/37; G06F 11/0742; G06F 11/0793; H04L 63/205
See application file for complete search history.

(56) References Cited

U.S. PATENT DOCUMENTS

| 2014/0006347 A1* | 1/2014 | Qureshi | H04L 9/0822 707/621 |
| 2017/0060653 A1* | 3/2017 | Nandakumar | G06F 11/0751 |
| 2019/0102244 A1* | 4/2019 | Tarlano | G06N 5/022 |

* cited by examiner

*Primary Examiner* — Joseph E Dean, Jr.
(74) *Attorney, Agent, or Firm* — FisherBroyles, LLP (57) ABSTRACT

The disclosed computer-implemented method for system recovery from a system user interface process malfunction may include (i) determining that a system user interface (UI) process is executing on the computing device, (ii) determining that a message indicating a malfunction of the system UI process is displayed on the computing device, (iii) identifying a mobile application that was executing on the computing device at a time of the malfunction of the system UI process, and (iv) in response to identifying the mobile application that was executing at the time of the malfunction of the system UI process, performing a security action for recovery from the malfunction of the system UI process. Various other methods, systems, and computer-readable media are also disclosed.

20 Claims, 6 Drawing Sheets

SYSTEMS AND METHODS FOR SYSTEM RECOVERY FROM A SYSTEM USER INTERFACE PROCESS MALFUNCTION

BACKGROUND

In the digital age, people may rely on their digital devices for a wide variety of activities, such as to communicate with others (e.g., email, calls, text messages, etc.), to create content, and/or manage activities. If the digital device suffers a malfunction that causes the device to become inoperable, the productivity of the user may be disrupted. In some cases, such malfunctions may occur without a clear path to recovery, especially if only a vague message regarding the occurrence of the malfunction is displayed on the digital device without recommendations for how to resolve the malfunction. In some instances, users may need to restart their device, but this may only be a temporary solution, as the malfunction may occur again. In some instances, such malfunctions may be caused by installing updates to the operating system and/or third-party applications of the device. Existing solutions for such errors may include requesting the user to perform a factory reset for the computing device or uninstalling application updates, which may not resolve the issue that caused the malfunction. Additionally, such solutions may not be presented to the user through the computing device, but rather through other communication channels, such as Frequently Asked Questions on a technical support website, or the like, which may not be readily available to the user of the inoperable device. The instant disclosure, therefore, identifies and addresses a need for systems and methods for system recovery from a system user interface process malfunction.

SUMMARY

As will be described in greater detail below, the instant disclosure describes various systems and methods for system recovery from a system user interface process malfunction.

In one example, a method for system recovery from a system user interface process malfunction may include (i) determining that a system user interface (UI) process is executing on the computing device, (ii) determining that a message indicating a malfunction of the system UI process is displayed on the computing device, (iii) identifying a mobile application that was executing on the computing device at a time of the malfunction of the system UI process, and (iv) in response to identifying the mobile application that was executing at the time of the malfunction of the system UI process, performing a security action for recovery from the malfunction of the system UI process.

In some examples, the security action may include querying a policy manager comprising a security policy to terminate potentially harmful mobile applications and terminating the mobile application based on the security policy. The security action may include querying a policy manager comprising a security policy to block potentially harmful mobile applications, blocking the mobile application from launching based on the security policy, and presenting, to a user of the computing device, a message that the mobile application is blocked in response to identifying that the mobile application was executing at the time of the malfunction of the system UI process. In some examples, the method may include generating a security policy based on an identification that the mobile application was executing at the time of the malfunction of the system UI process. The security policy may include the security action blocking the mobile application from being executed upon determining, at an application run-time, that the mobile application is potentially harmful and transmitting the security policy to a policy manager. In some examples, identifying the mobile application executing on the computing device at the time of the malfunction of the system UI process may include receiving data associated with the mobile application through an accessibility service of the computing device and identifying the mobile application executing at the time of the malfunction of the system UI process based on the data from the accessibility service. Identifying the mobile application executing at the time of the malfunction of the system UI process may include receiving data associated with the mobile application through an application status manager of the computing device and identifying the mobile application that was executing at the time of the malfunction of the system UI process based on the data from the application status manager. In some examples, determining that the message indicating the malfunction of the system UI process is displayed may include detecting presentation of a dialog box comprising the message and determining that the message comprises one or more words from a pre-defined list. Determining that the system UI process is executing on the computing device may include detecting that a system UI package for the system UI process is active.

In one embodiment, a system for system recovery from a system user interface process malfunction may include at least one physical processor and physical memory that includes computer-executable instructions that, when executed by the physical processor, cause the physical processor to (i) determine that a system user interface (UI) process is executing on the computing device, (ii) determine that a message indicating a malfunction of the system UI process is displayed on the computing device, (iii) identify a mobile application that was executing on the computing device at a time of the malfunction of the system UI process, and (iv) in response to identifying the mobile application that was executing at the time of the malfunction of the system UI process, perform a security action for recovery from the malfunction of the system UI process.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) determine that a system user interface (UI) process is executing on the computing device, (ii) determine that a message indicating a malfunction of the system UI process is displayed on the computing device, (iii) identify a mobile application that was executing on the computing device at a time of the malfunction of the system UI process, and (iv) in response to identifying the mobile application that was executing at the time of the malfunction of the system UI process, perform a security action for recovery from the malfunction of the system UI process.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for system recovery from a system user interface process malfunction. As will be described in greater detail below, an accessibility service or an application usage state manager provided by the operating system (OS) of a computing device may be used to identify an application executing at the time of a system user interface (UI) process malfunction. Accessibility features of the computing device may provide user interface enhancements to assist users with disabilities or users who may be unable to fully interact with the computing device. By utilizing an accessibility service of the computing device, data associated with mobile applications may be obtained. In some examples, the systems and methods described herein may use the accessibility service to capture data from active mobile applications of the computing device. The data may be used to identify the mobile application. Upon identification of the mobile application, security actions may be performed for recovery of the device from a system UI process malfunction.

Figure 1:
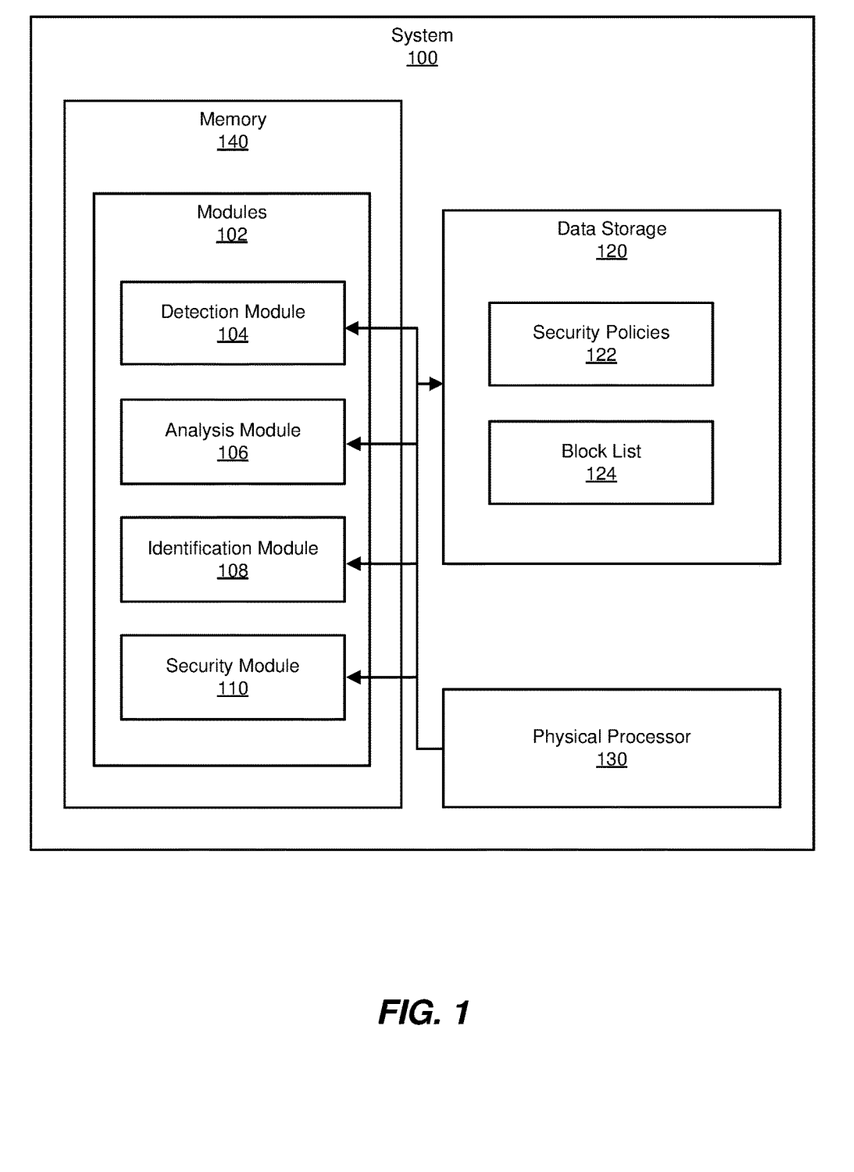
FIG. 1 is a block diagram of an example system for system recovery from a system user interface process malfunction.
Figure 2:
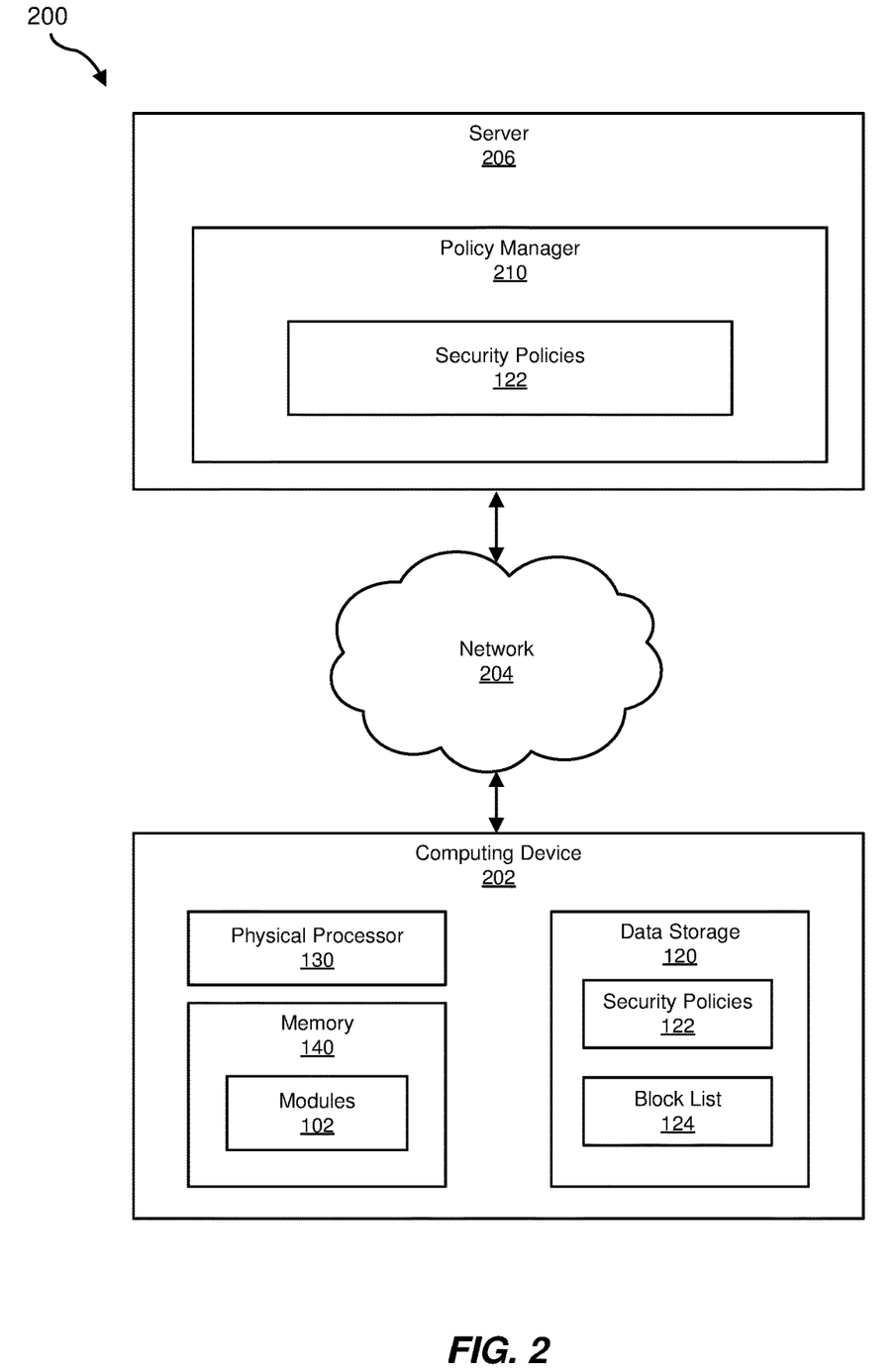
FIG. 2 is a block diagram of an additional example system for system recovery from a system user interface process malfunction.

The following will provide, with reference to FIGS. 1-2, detailed descriptions of example systems for system recovery from a system user interface process malfunction. Detailed descriptions of corresponding computer-implemented methods will also be provided in connection with FIG. 3. A detailed description of data flow through the example system for system recovery from a system user interface process malfunction will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for system recovery from a system user interface process malfunction. As illustrated in this figure, the example system 100 may include one or more modules 102 for performing one or more tasks. As will be explained in greater detail below, the modules 102 may include a detection module 104, an analysis module 106, an identification module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., a computing device 202 and/or a server 206). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate system recovery from a system user interface process malfunction. Examples of the physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store security policies 122 and/or block list 124.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with a server 206 via a network 204. In one example, all or a portion of the functionality of the modules 102 may be performed by the computing device 202, the server 206, and/or any other suitable computing system. As will be described in greater detail below, one or more of the modules 102 from FIG. 1 may, when executed by at least one processor of the computing device 202 and/or the server 206, enable the computing device 202 and/or the server 206 for system recovery from a system user interface process malfunction. For example, and as will be described in greater detail below, one or more of the modules 102 may cause the computing device 202 and/or the server 206 to determine that a system user interface process is executing on the computing device 202, determine that a message indicating a malfunction of the system user interface process is displayed on the computing device 202, identifying a mobile application that was executing on the computing device 202 at a time of the malfunction of the system user interface process, and in response to identifying the mobile application that was executing at the time of the malfunction of the system user interface process, performing a security action for recovery from the malfunction of the system user interface process.

The computing device 202 generally represents any type or form of computing device capable of reading computer-executable instructions. For example, the computing device 202 may include an endpoint device (e.g., a mobile computing device) running client-side security software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions. In one example, the server 206 may represent a server capable of hosting a policy manager 210 to facilitate enforcement of security policies 122 for the computing device 202 to recover from and prevent future malfunctions of the system user interface process. Additional examples of the server 206 include, without limitation, security servers, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and/or the server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
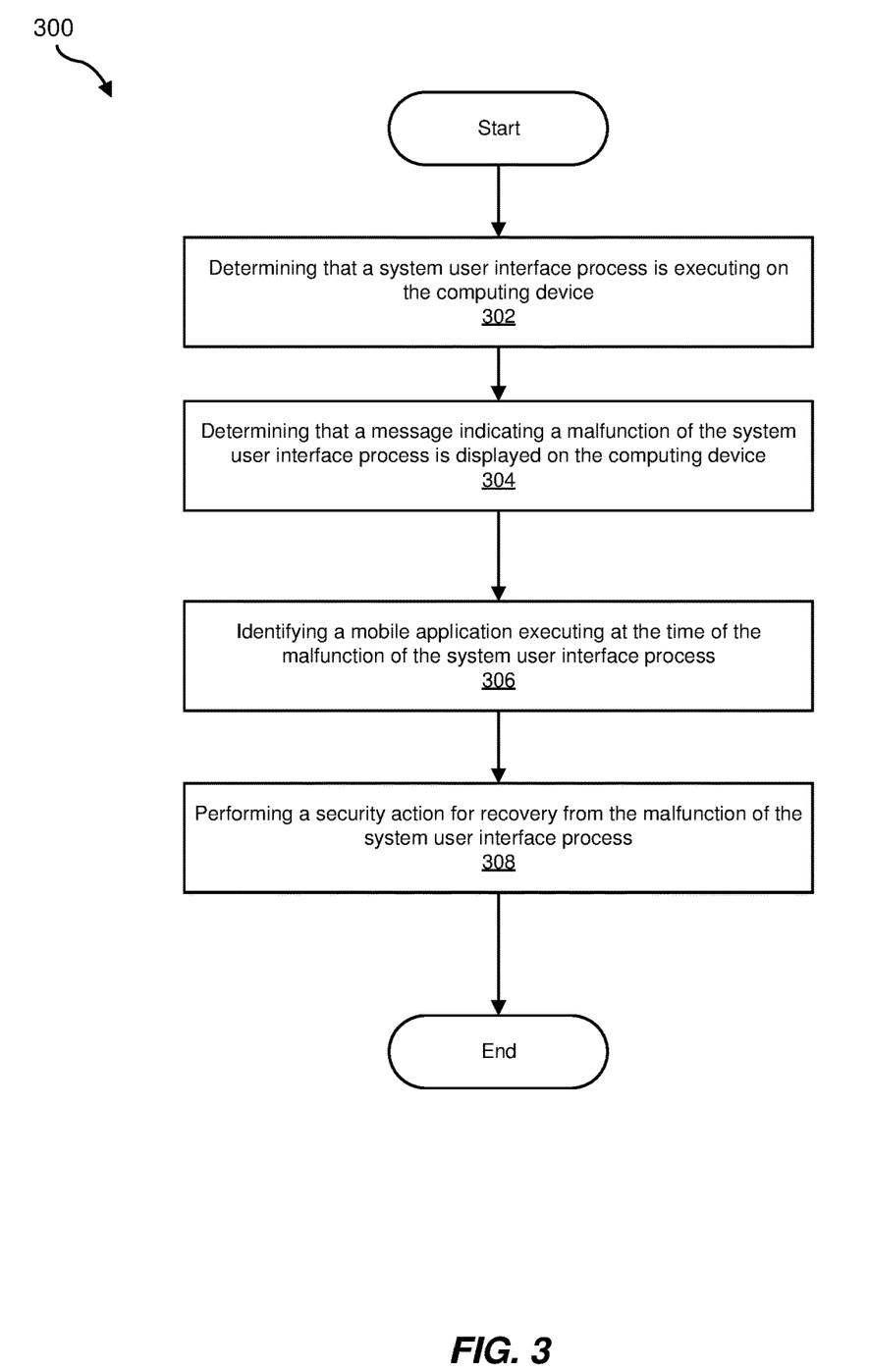
FIG. 3 is a flow diagram of an example method for system recovery from a system user interface process malfunction.
Figure 4:
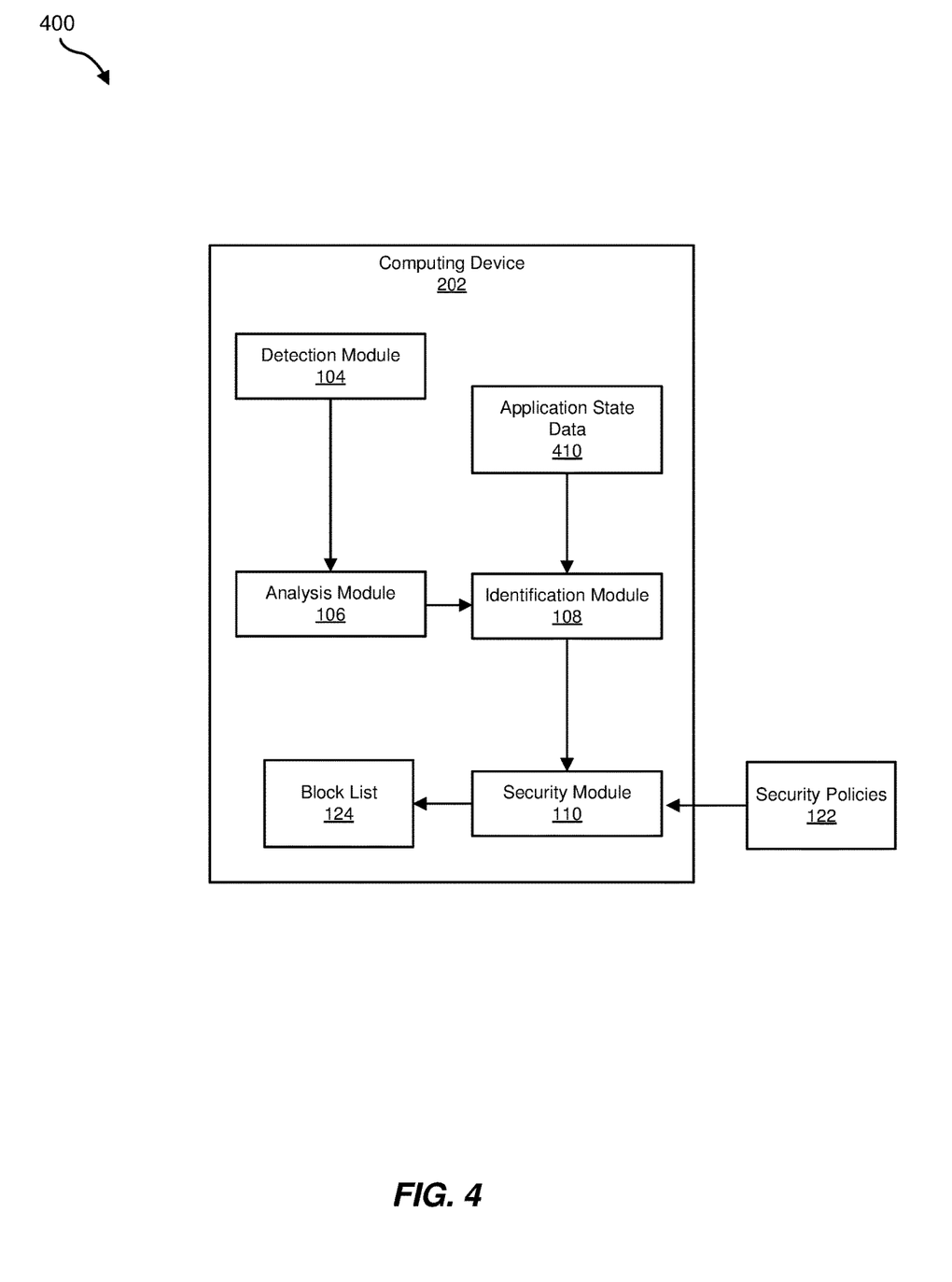
FIG. 4 is a data flow diagram of an example system for system recovery from a system user interface process malfunction.

FIG. 3 is a flow diagram of an example computer-implemented method 300 for system recovery from a system user interface process malfunction. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may determine that the system UI process is executing on a computing device, such as the computing device 202. The system may determine that the system UI process is executing on the computing device 202 in any suitable manner. For example, detection module 104 of computing device 202 may detect that a system UI package for the system UI process is active. The detection module 104 may scan, for example, an activity manager of the computing device 202 to detect whether the system UI package for the system UI process is displayed. For an Android™ device, the detection module 104 may scan the activity manager to determine whether the system UI package "com.android.systemui" is displayed. In some examples, the detection module 104 may determine whether the system UI package is running in the foreground of the computing device 202.

At step 304 one or more of the systems described herein may determine that a message indicating a malfunction of the system UI process is displayed on the computing device 202. The system may determine that the message indicating the malfunction of the system UI process in any suitable manner. In some examples, after receiving an indication from the detection module 104 that the system UI package is running the foreground of the computing device 202, the analysis module 106 of the computing device 202 may detect the presentation of a dialog box that includes a message. The analysis module 106 may scan the activity manager to determine whether an activity associated with the display of a dialog box is active. For example, the analysis module 106 may determine whether an "android.app.AlertDialog" activity is listed in the activity manager.

In some examples, upon detecting the display of a dialog box, the analysis module 106 may analyze the message displayed in the dialog box to determine whether the message is associated with the malfunction of the system UI process. The analysis module 106 may parse the message and compare the components of the message to a pre-defined list of words associated with the malfunction of the system UI process. For example, the pre-defined list may contain words that are specific to the malfunction of the system UI process. Examples of words that may be included in the pre-defined list include specific error codes, names and/or phrases associated with the system UI process, or the like. The analysis module 106 may determine that the dialog box is associated with the malfunction of the system UI process if the message contains words from the-predefined list. In some examples, the number of words in the message must exceed a predetermined threshold (e.g., 3-5 words) from the pre-defined list.

In some examples, the analysis module 106 may also analyze other components of the dialog box to determine whether the dialog box is associated with the malfunction of the system UI. For example, the analysis module 106 may analyze the number of buttons included in the dialog box and/or the words associated with the buttons. The analysis module 106 may determine that the dialog box is associated with the malfunction of the system UI process based on the number of buttons included in the dialog box and the words associated with the buttons. For example, the dialog box may include a button that displays the word "OK" and a button that displays the world "report." Based on a pre-defined rule for identifying dialog boxes associated with the malfunction, the analysis module 106 may determine that the displayed dialog box is associated with the malfunction of the system UI process because at least one of the buttons is an action to report data associated with a malfunction of the computing device 202. Upon determining that the dialog box is associated with the malfunction of the system UI process, the method may proceed to step 306.

At step 306, one or more of the systems described herein may identify a mobile application executing at the time of the malfunction of the system UI process. The system may identify the mobile application executing at the time of the malfunction of the system UI process in any suitable manner. For example, the identification module 108 may, in response to determining that the message of the dialog box is associated with the malfunction of the system UI process, receive data associated with the mobile application through the accessibility service provided by the OS of the computing device 202. The identification module 108 may be registered with the accessibility service to receive events from one or more applications. The identification module 108 may receive events and use data from the events to identify one or more mobile applications executing at the time of the malfunction of the system UI process. For example, the identification module 108 may compare time stamps of events received to a time associated with the malfunction.

The term "accessibility service," as used herein, generally refers to a service of the operating system of a computing device that provides user interface enhancements to assist users with disabilities or users who may be unable to fully interact with a device. Users who are driving, attending an event with loud noises, or otherwise unable to engage with the computing device may need additional or alternative interface feedback. An accessibility service may provide additional information about applications or data received through applications to enable applications to aid users by performing an action on behalf of users to make interacting with applications simpler and more productive.

In some examples, identification module 108 may receive data associated with the mobile application through an application status manager provided by the OS of the computing device 202. The identification module 108 may determine one or more applications that were active on the computing device 202 at or near the time of the malfunction of the system UI process.

At step 308, one or more of the systems described herein may perform a security action based on identifying the mobile application. The system may perform the security action in any suitable manner. In some examples, the security module 110 may receive, from the identification module 108, data associated with the identified mobile application executing at the time of the malfunction of the system UI process. In response to receiving the data associated with the identified mobile application, the security module 110 may perform one or more security actions.

In one example, the security action may include applying a security policy 122. In some examples, the security module 110 may obtain one or more security policies 122 from the data storage 120 of the computing device 202. If the security module 110 determines that the security policies 122 do not exist in the data storage 120 or are out of date (e.g., last synchronization with the server 206 exceeds a predetermined time period), the security module 110 may query a policy manager, such as policy manager 210, to obtain one or more security policies 122. The policy manager 210 may manage one or more security policies 122 associated the computing device 202. In some examples, the security policies 122 may include a policy that includes instructions to terminate potentially harmful mobile applications. In some examples, the security module 110, may obtain the security policy and may store the security policy 122 locally, such as in data storage 120. In some examples, upon receiving data associated with a mobile application that may have caused the malfunction of the system UI process, the security module 110 may execute the security policy 122. For example, the security module 110 may terminate the mobile application based on the security policy 122.

In some examples, the security action performed by the security module 110 may include querying the policy manager 210 or data storage 120 to obtain a security policy 122 to block potentially harmful mobile applications. The security module 110 may, upon receiving data associated with the identified mobile application, may execute the security policy 122. In some examples, the security module 110 may add data identifying the mobile application to the block list 124. The block list 124 may be stored in the data storage 120 of the computing device 202 or may be transmitted to the policy manager 210 of the server 206. The security module 110 may check the block list 124 and determine to block the mobile application from launching based on the security policy 122. The security module 110 may present, to a user of the computing device 202, a message indicating that the mobile application is blocked in response to identifying that the mobile application was executing at the time of a previous malfunction of the system UI process.

In some examples, the security module 110 may perform a security action that includes generating a new security policy based on identifying the mobile application that was executing at the time of the malfunction of the system UI process. For example, the security module 110 may generate the new security policy in response to receiving data associated with the mobile application. The security module 110 may include one or more parameters in the new security policy, such as an identifier associated with the mobile application, a version number associated with the mobile application, the type of computing device upon which the malfunction occurred, and the like. The security policy may include a security action to block the mobile application from being executed upon determining, at an application run-time, that the mobile application is potentially harmful. In some examples, the security module 110 may transmit the security policy 122 to the policy manager 210. The policy manager 210 may enable distribution of the security policy 122 to similar computing devices 202.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of computing device 202, enable the system 400 to recover from a system user interface process malfunction. For example, and as will be described in greater detail below, one or more of the modules 102 may cause the example system 400 to determine, by the detection module 104, that the system UI process is executing on the computing device 202. The analysis module 106 may determine that a message indicating the malfunction of the system UI process is displayed on the computing device 202. The identification module 108 may identify a mobile application that was executing on the computing device 202 at a time of the malfunction of the system UI process. For example, the identification module 108 may obtain application state data 410 by using an accessibility service of the computing device 202 or from an application usage state manager of the computing device 202. The security module 110 may, in response to identifying the mobile application that was executing at the time of the malfunction of the system UI process, perform a security action for recovery of the computing device 202 from the malfunction of the system UI process.

The systems and methods described herein are generally directed to recovery of a computing device from a system UI process malfunction. Existing solutions typically require a user to initiate a factory reset of the computing device or to uninstall application updates to fix system UI process malfunctions. The systems and methods described herein are directed to detecting when a system UI process malfunction is occurring, identifying an application that may be causing the malfunction, and terminating the application to enable the computing device to recover from the malfunction and resume operability. The systems and methods may determine whether a system UI process is executing on a computing device, determine that a message associated with the malfunction is being displayed, and then identify a mobile application that was executing on the computing device at the time of the malfunction. In response to identifying the mobile application that was executing at the time of the malfunction, a security action for recovery from the malfunction of the system UI process may be performed.

Figure 5:
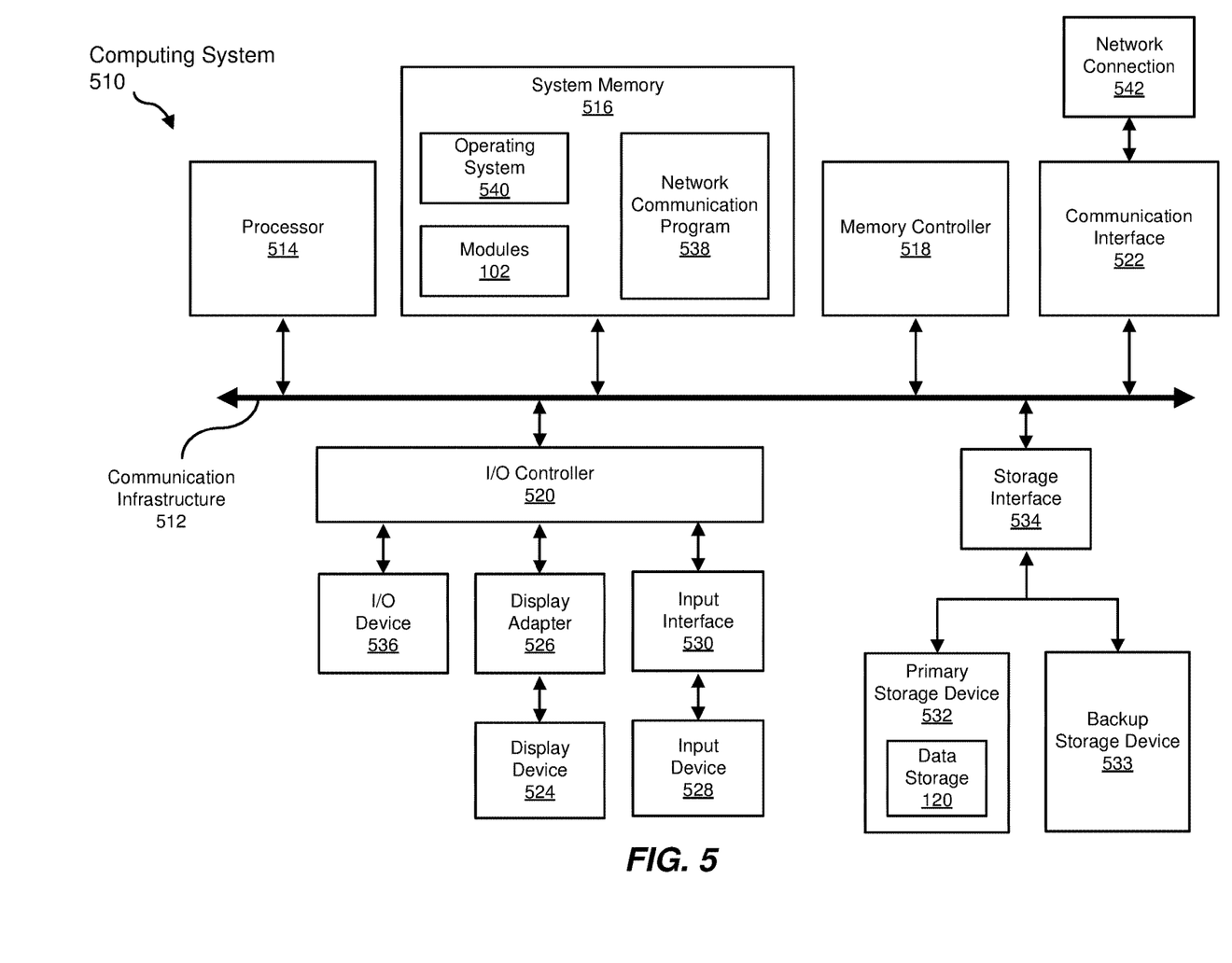
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of the computing system 510 may perform and/or be a means for performing, either alone or in combination with other elements, one or more of the steps described herein (such as one or more of the steps illustrated in FIGS. 3-4). All or a portion of the computing system 510 may also perform and/or be a means for performing any other steps, methods, or processes described and/or illustrated herein.

The computing system 510 broadly represents any single or multi-processor computing device or system capable of executing computer-readable instructions. Examples of the computing system 510 include, without limitation, workstations, laptops, client-side terminals, servers, distributed computing systems, handheld devices, or any other computing system or device. In its most basic configuration, the computing system 510 may include at least one processor 514 and a system memory 516.

The processor 514 generally represents any type or form of physical processing unit (e.g., a hardware-implemented central processing unit) capable of processing data or interpreting and executing instructions. In certain embodiments, the processor 514 may receive instructions from a software application or module. These instructions may cause the processor 514 to perform the functions of one or more of the example embodiments described and/or illustrated herein.

The system memory 516 generally represents any type or form of volatile or non-volatile storage device or medium capable of storing data and/or other computer-readable instructions. Examples of the system memory 516 include, without limitation, Random Access Memory (RAM), Read Only Memory (ROM), flash memory, or any other suitable memory device. Although not required, in certain embodiments, the computing system 510 may include both a volatile memory unit (such as, for example, system memory 516) and a non-volatile storage device (such as, for example, primary storage device 532, as described in detail below). In one example, one or more of the modules 102 from FIG. 1 may be loaded into the system memory 516.

In some examples, the system memory 516 may store and/or load an operating system 540 for execution by the processor 514. In one example, the operating system 540 may include and/or represent software that manages computer hardware and software resources and/or provides common services to computer programs and/or applications on the computing system 510. Examples of the operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 510 may also include one or more components or elements in addition to the processor 514 and the system memory 516. For example, as illustrated in FIG. 5, the computing system 510 may include a memory controller 518, an Input/Output (I/O) controller 520, and a communication interface 522, each of which may be interconnected via a communication infrastructure 512. The communication infrastructure 512 generally represents any type or form of infrastructure capable of facilitating communication between one or more components of a computing device. Examples of the communication infrastructure 512 include, without limitation, a communication bus (such as an Industry Standard Architecture (ISA), Peripheral Component Interconnect (PCI), PCI Express (PCIe), or similar bus) and a network.

The memory controller 518 generally represents any type or form of device capable of handling memory or data or controlling communication between one or more components of the computing system 510. For example, in certain embodiments, the memory controller 518 may control communication between the processor 514, the system memory 516, and the I/O controller 520 via the communication infrastructure 512.

The I/O controller 520 generally represents any type or form of module capable of coordinating and/or controlling the input and output functions of a computing device. For example, in certain embodiments, the I/O controller 520 may control or facilitate transfer of data between one or more elements of the computing system 510, such as the processor 514, the system memory 516, the communication interface 522, the display adapter 526, the input interface 530, and the storage interface 534.

As illustrated in FIG. 5, the computing system 510 may also include at least one display device 524 coupled to the I/O controller 520 via a display adapter 526. The display device 524 generally represents any type or form of device capable of visually displaying information forwarded by the display adapter 526. Similarly, the display adapter 526 generally represents any type or form of device configured to forward graphics, text, and other data from the communication infrastructure 512 (or from a frame buffer, as known in the art) for display on the display device 524.

As illustrated in FIG. 5, the example computing system 510 may also include at least one input device 528 coupled to the I/O controller 520 via an input interface 530. The input device 528 generally represents any type or form of input device capable of providing input, either computer or human generated, to example computing system 510. Examples of the input device 528 include, without limitation, a keyboard, a pointing device, a speech recognition device, variations or combinations of one or more of the same, and/or any other input device.

Additionally or alternatively, the example computing system 510 may include additional I/O devices. For example, the example computing system 510 may include the I/O device 536. In this example, the I/O device 536 may include and/or represent a user interface that facilitates human interaction with the computing system 510. Examples of the I/O device 536 include, without limitation, a computer mouse, a keyboard, a monitor, a printer, a modem, a camera, a scanner, a microphone, a touchscreen device, variations or combinations of one or more of the same, and/or any other I/O device.

The communication interface 522 broadly represents any type or form of communication device or adapter capable of facilitating communication between the example computing system 510 and one or more additional devices. For example, in certain embodiments, the communication interface 522 may facilitate communication between the computing system 510 and a private or public network including additional computing systems. Examples of the communication interface 522 include, without limitation, a wired network interface (such as a network interface card), a wireless network interface (such as a wireless network interface card), a modem, and any other suitable interface. In at least one embodiment, the communication interface 522 may provide a direct connection to a remote server via a direct link to a network, such as the Internet. The communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 522 may also represent a host adapter configured to facilitate communication between the computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 522 may also allow the computing system 510 to engage in distributed or remote computing. For example, the communication interface 522 may receive instructions from a remote device or send instructions to a remote device for execution.

In some examples, the system memory 516 may store and/or load a network communication program 538 for execution by the processor 514. In one example, the network communication program 538 may include and/or represent software that enables the computing system 510 to establish a network connection 542 with another computing system (not illustrated in FIG. 5) and/or communicate with the other computing system by way of the communication interface 522. In this example, the network communication program 538 may direct the flow of outgoing traffic that is sent to the other computing system via the network connection 542. Additionally, or alternatively, the network communication program 538 may direct the processing of incoming traffic that is received from the other computing system via the network connection 542 in connection with the processor 514.

Although not illustrated in this way in FIG. 5, the network communication program 538 may alternatively be stored and/or loaded in the communication interface 522. For example, the network communication program 538 may include and/or represent at least a portion of software and/or firmware that is executed by a processor and/or Application Specific Integrated Circuit (ASIC) incorporated in the communication interface 522.

As illustrated in FIG. 5, the example computing system 510 may also include a primary storage device 532 and a backup storage device 533 coupled to the communication infrastructure 512 via a storage interface 534. The storage devices 532 and 533 generally represent any type or form of storage device or medium capable of storing data and/or other computer-readable instructions. For example, the storage devices 532 and 533 may be a magnetic disk drive (e.g., a so-called hard drive), a solid state drive, a floppy disk drive, a magnetic tape drive, an optical disk drive, a flash drive, or the like. The storage interface 534 generally represents any type or form of interface or device for transferring data between the storage devices 532 and 533 and other components of the computing system 510. In one example, the data storage 120 from FIG. 1 may be stored and/or loaded in the primary storage device 532.

In certain embodiments, the storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 532 and 533 may also include other similar structures or devices for allowing computer software, data, or other computer-readable instructions to be loaded into the computing system 510. For example, the storage devices 532 and 533 may be configured to read and write software, data, or other computer-readable information. The storage devices 532 and 533 may also be a part of the computing system 510 or may be a separate device accessed through other interface systems.

Many other devices or subsystems may be connected to the computing system 510. Conversely, all of the components and devices illustrated in FIG. 5 need not be present to practice the embodiments described and/or illustrated herein. The devices and subsystems referenced above may also be interconnected in different ways from that shown in FIG. 5. The computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 510. All or a portion of the computer program stored on the computer-readable medium may then be stored in the system memory 516 and/or various portions of the storage devices 532 and 533. When executed by the processor 514, a computer program loaded into the computing system 510 may cause the processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 510 may be configured as an Application Specific Integrated Circuit (ASIC) adapted to implement one or more of the example embodiments disclosed herein.

Figure 6:
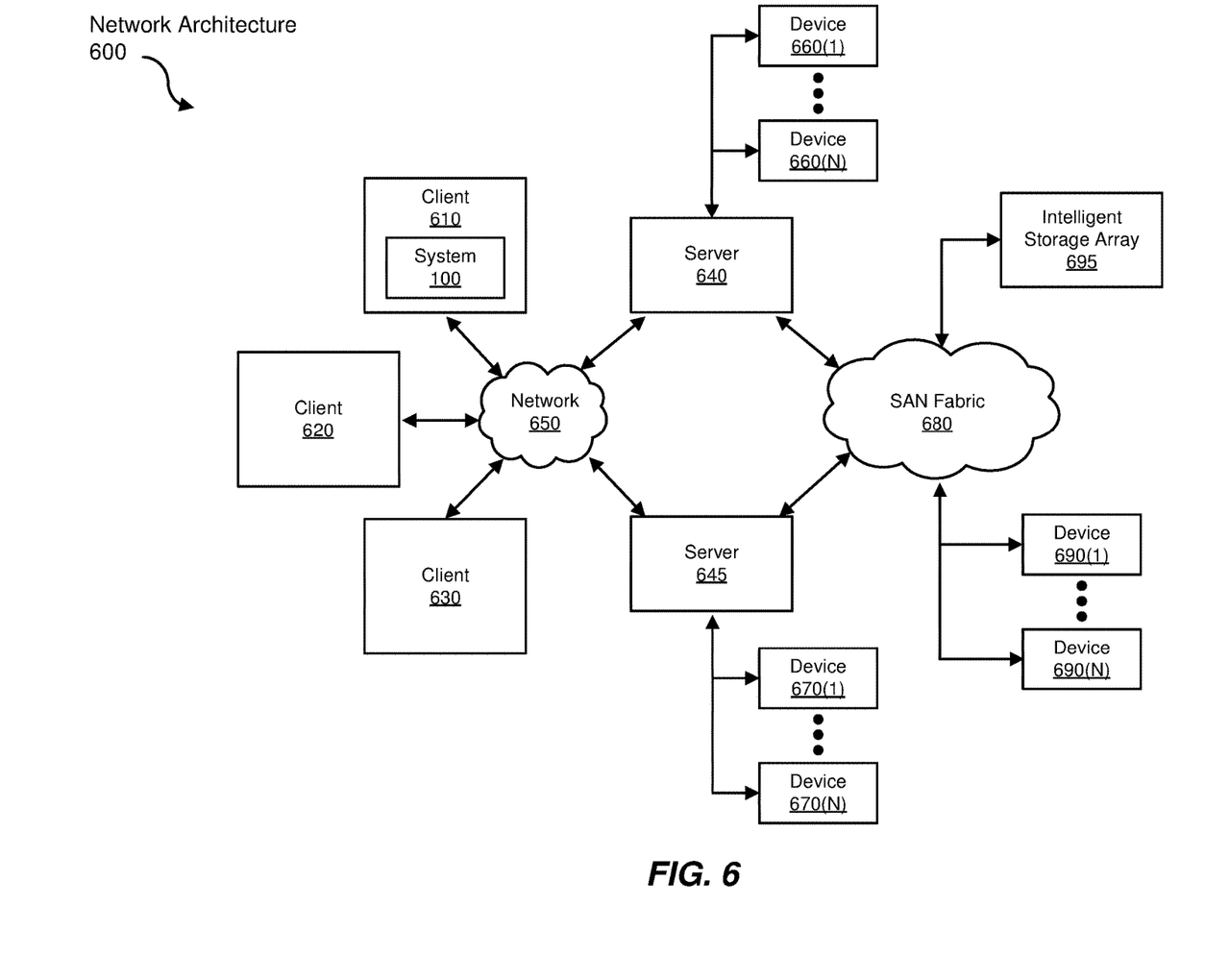
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of the network architecture 600 may perform and/or be a means for performing, either alone or in combination with other elements, one or more of the steps disclosed herein (such as one or more of the steps illustrated in FIG. 3). All or a portion of the network architecture 600 may also be used to perform and/or be a means for performing other steps and features set forth in the instant disclosure.

The client systems 610, 620, and 630 generally represent any type or form of computing device or system, such as example the computing system 510 in FIG. 5. Similarly, the servers 640 and 645 generally represent computing devices or systems, such as application servers or database servers, configured to provide various database services and/or run certain software applications. The network 650 generally represents any telecommunication or computer network including, for example, an intranet, a WAN, a LAN, a PAN, or the Internet. In one example, the client systems 610, 620, and/or 630 and/or the servers 640 and/or 645 may include all or a portion of the system 100 from FIG. 1.

As illustrated in FIG. 6, one or more storage devices 660(1)-(N) may be directly attached to the server 640. Similarly, the one or more storage devices 670(1)-(N) may be directly attached to the server 645. The storage devices 660(1)-(N) and the storage devices 670(1)-(N) generally represent any type or form of storage device or medium capable of storing data and/or other computer-readable instructions. In certain embodiments, the storage devices 660(1)-(N) and the storage devices 670(1)-(N) may represent Network-Attached Storage (NAS) devices configured to communicate with the servers 640 and 645 using various protocols, such as Network File System (NFS), Server Message Block (SMB), or Common Internet File System (CIFS).

The servers 640 and 645 may also be connected to a Storage Area Network (SAN) fabric 680. The SAN fabric 680 generally represents any type or form of computer network or architecture capable of facilitating communication between a plurality of storage devices. The SAN fabric 680 may facilitate communication between the servers 640 and 645 and a plurality of the storage devices 690(1)-(N) and/or an intelligent storage array 695. The SAN fabric 680 may also facilitate, via the network 650 and the servers 640 and 645, communication between the client systems 610, 620, and 630 and the storage devices 690(1)-(N) and/or the intelligent storage array 695 in such a manner that the devices 690(1)-(N) and they array 695 appear as locally attached devices to the client systems 610, 620, and 630. As with the storage devices 660(1)-(N) and the storage devices 670(1)-(N), the storage devices 690(1)-(N) and the intelligent storage array 695 generally represent any type or form of storage device or medium capable of storing data and/or other computer-readable instructions.

In certain embodiments, and with reference to the example computing system 510 of FIG. 5, a communication interface, such as communication interface 522 in FIG. 5, may be used to provide connectivity between each client system 610, 620, and 630 and the network 650. The client systems 610, 620, and 630 may be able to access information on the server 640 or 645 using, for example, a web browser or other client software. Such software may allow the client systems 610, 620, and 630 to access data hosted by the server 640, the server 645, the storage devices 660(1)-(N), the storage devices 670(1)-(N), the storage devices 690(1)-(N), or the intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 640, the server 645, the storage devices 660(1)-(N), the storage devices 670(1)-(N), the storage devices 690(1)-(N), the intelligent storage array 695, or any combination thereof. All or a portion of one or more of the example embodiments disclosed herein may also be encoded as a computer program, stored in the server 640, run by the server 645, and distributed to the client systems 610, 620, and 630 over the network 650.

As detailed above, the computing system 510 and/or one or more components of the network architecture 600 may perform and/or be a means for performing, either alone or in combination with other elements, one or more steps of an example method for system recovery from a system user interface process malfunction.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for system recovery from a system user interface process malfunction, at least a portion of the method being performed by a computing device comprising at least one processor, the method comprising:
- determining, by the computing device, that a system user interface (UI) process is executing on the computing device;
- detecting, by the computing device, that a dialog box comprising a message indicating a malfunction of the system UI process is displayed on the computing device;
- identifying, by the computing device, a mobile application that was executing on the computing device at a time of the malfunction of the system UI process, wherein the identifying includes receiving, by the computing device, data associated with the mobile application through a service that is an accessibility service of the computing device that provides user interface enhancements to assist users with disabilities or users who are unable to fully interact with the computing device; and
- in response to identifying the mobile application that was executing at the time of the malfunction of the system UI process, performing, by the computing device, a security action for recovery from the malfunction of the system UI process.

2. The computer-implemented method of claim 1, wherein the security action comprises:
- querying a policy manager comprising a security policy to terminate potentially harmful mobile applications; and
- terminating the mobile application based on the security policy.

3. The computer-implemented method of claim 1, wherein the security action comprises:
- querying a policy manager comprising a security policy to block potentially harmful mobile applications;
- blocking the mobile application from launching based on the security policy; and
- presenting, to a user of the computing device, a new message that the mobile application is blocked in response to identifying that the mobile application was executing at the time of the malfunction of the system UI process.

4. The computer-implemented method of claim 1, further comprising:
- generating a security policy based on an identification that the mobile application was executing at the time of the malfunction of the system UI process, wherein the security policy comprises the security action blocking the mobile application from being executed upon determining, at an application run-time, that the mobile application is potentially harmful; and
- transmitting the security policy to a policy manager.

5. The computer-implemented method of claim 1, further comprising:
- registering with the accessibility service, by the computing device, to receive events from one or more mobile applications executable on the computing device,
- wherein the accessibility service provides additional information about the one or more mobile applications or data received through the one or more mobile applications to enable the one or more mobile applications to aid users by performing an action on behalf of the users;
- wherein identifying the mobile application executing on the computing device at the time of the malfunction of the system UI process further comprises:
  - identifying the mobile application executing at the time of the malfunction of the system UI process based on the data from the accessibility service.

6. The computer-implemented method of claim 1, wherein identifying the mobile application executing at the time of the malfunction of the system UI process further comprises:
- receiving data associated with the mobile application through an application status manager of the computing device; and
- identifying the mobile application that was executing at the time of the malfunction of the system UI process based on the data from the application status manager.

7. The computer-implemented method of claim 1, wherein determining that the message indicating the malfunction of the system UI process is displayed comprises:
- parsing the message of the dialog box; and
- determining that the message comprises one or more words from a pre-defined list.

8. The computer-implemented method of claim 1, wherein determining that the system UI process is executing on the computing device comprises:
- detecting that a system UI package for the system UI process is active.

9. A system for system recovery from a system user interface process malfunction, the system comprising:
- at least one physical processor;
- physical memory comprising computer-executable instructions that, when executed by the physical processor, cause the physical processor to:
  - determine that a system user interface (UI) process is executing on a computing device;
  - detect that a dialog box comprising a message indicating a malfunction of the system UI process is displayed on the computing device;
  - identify a mobile application that was executing on the computing device at a time of the malfunction of the system UI process, wherein the computer-executable instructions cause the physical processor to identify the mobile application at least in part by receiving data associated with the mobile application through a service that is an accessibility service of the computing device that provides user interface enhancements to assist users with disabilities or users who are unable to fully interact with the computing device; and
  - in response to identifying the mobile application that was executing at the time of the malfunction of the system UI process, perform a security action for recovery from the malfunction of the system UI process.

10. The system of claim 9, wherein the security action comprises:
- querying a policy manager comprising a security policy to terminate potentially harmful mobile applications; and
- terminating the mobile application based on the security policy.

11. The system of claim 9, wherein the security action comprises:
- querying a policy manager comprising a security policy to block potentially harmful mobile applications;
- blocking the mobile application from launching based on the security policy; and
- presenting, to a user of the computing device, a new message that the mobile application is blocked in response to identifying that the mobile application was executing at the time of the malfunction of the system UI process.

12. The system of claim 9, wherein the computer-executable instructions further cause the physical processor to:
generate a security policy based on an identification that the mobile application was executing at the time of the malfunction of the system UI process, wherein the security policy comprises the security action blocking the mobile application from being executed upon determining, at an application run-time, that the mobile application is potentially harmful; and
transmit the security policy to a policy manager.

13. The system of claim 9, wherein the computer-executable instructions further cause the physical processor to:
register with the accessibility service to receive events from one or more mobile applications executable on the computing device,
wherein the accessibility service provides additional information about the one or more mobile applications or data received through the one or more mobile applications to enable the one or more mobile applications to aid users by performing an action on behalf of the users;
wherein, to identify the mobile application executing on the computing device at the time of the malfunction of the system UI process, the computer-executable instructions further cause the physical processor to:
identify the mobile application executing at the time of the malfunction of the system UI process based on the data from the accessibility service.

14. The system of claim 9, wherein, to identify the mobile application executing at the time of the malfunction of the system UI process, the computer-executable instructions further cause the physical processor to:
receive data associated with the mobile application through an application status manager of the computing device; and
identify the mobile application that was executing at the time of the malfunction of the system UI process based on the data from the application status manager.

15. The system of claim 9, wherein, to determine that the message indicating the malfunction of the system UI process is displayed, the computer-executable instructions further cause the physical processor to:
parse the message of the dialog box; and
determine that the message comprises one or more words from a pre-defined list.

16. The system of claim 9, wherein, to determine that the system UI process is executing on the computing device, the computer-executable instructions further cause the physical processor to:
detect that a system UI package for the system UI process is active.

17. A non-transitory computer-readable medium comprising one or more computer-executable instructions that, when executed by at least one processor of a computing device, cause the computing device to:
determine that a system user interface (UI) process is executing on the computing device;
detect that a dialog box comprising a message indicating a malfunction of the system UI process is displayed on the computing device;
identify a mobile application that was executing on the computing device at a time of the malfunction of the system UI process, wherein the computer-executable instructions cause the computing device to identify the mobile application at least in part by receiving data associated with the mobile application through a service that is an accessibility service of the computing device that provides user interface enhancements to assist users with disabilities or users who are unable to fully interact with the computing device; and
in response to identifying the mobile application that was executing at the time of the malfunction of the system UI process, perform a security action for recovery from the malfunction of the system UI process.

18. The non-transitory computer-readable medium of claim 17, wherein the security action comprises:
querying a policy manager comprising a security policy to terminate potentially harmful mobile applications; and
terminating the mobile application based on the security policy.

19. The non-transitory computer-readable medium of claim 17, wherein the security action comprises:
querying a policy manager comprising a security policy to block potentially harmful mobile applications;
blocking the mobile application from launching based on the security policy; and
presenting, to a user of the computing device, a new message that the mobile application is blocked in response to identifying that the mobile application was executing at the time of the malfunction of the system UI process.

20. The non-transitory computer-readable medium of claim 17, wherein the one or more computer-executable instructions further cause the computing device to:
generate a security policy based on an identification that the mobile application was executing at the time of the malfunction of the system UI process, wherein the security policy comprises the security action blocking the mobile application from being executed upon determining, at an application run-time, that the mobile application is potentially harmful; and
transmit the security policy to a policy manager.

* * * * *